United States Patent
Hong et al.

(10) Patent No.: US 11,096,086 B2
(45) Date of Patent: Aug. 17, 2021

(54) METHOD FOR TRANSMITTING FEEDBACK INFORMATION IN FED2D ENVIRONMENT AND APPARATUS THEREFOR

(71) Applicant: LG ELECTRONICS INC., Seoul (KR)

(72) Inventors: Jongwoo Hong, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/093,438

(22) PCT Filed: Apr. 13, 2017

(86) PCT No.: PCT/KR2017/004002
§ 371 (c)(1),
(2) Date: Oct. 12, 2018

(87) PCT Pub. No.: WO2017/179922
PCT Pub. Date: Oct. 19, 2017

(65) Prior Publication Data
US 2019/0141566 A1 May 9, 2019

Related U.S. Application Data

(60) Provisional application No. 62/322,754, filed on Apr. 14, 2016.

(51) Int. Cl.
*H04W 28/04* (2009.01)
*H04W 72/04* (2009.01)
(Continued)

(52) U.S. Cl.
CPC ......... *H04W 28/04* (2013.01); *H04W 72/04* (2013.01); *H04W 88/04* (2013.01); *H04W 92/18* (2013.01); *H04L 1/00* (2013.01)

(58) Field of Classification Search
CPC ..... H04W 28/04; H04W 72/04; H04W 88/04; H04W 92/18; H04L 1/00
See application file for complete search history.

(56) References Cited

U.S. PATENT DOCUMENTS

2014/0328329 A1* 11/2014 Novlan ............... H04W 72/042
   370/336
2015/0023267 A1* 1/2015 Lim ..................... H04L 1/1854
   370/329

(Continued)

OTHER PUBLICATIONS

Lei et al, "Operator controlled device-to-device communications in LTE-advanced networks," IEEE Wireless Commun., vol. 19, No. 3, pp. 96-104, Jun. 2012 (Year: 2012).*

(Continued)

*Primary Examiner* — Kwang B Yao
*Assistant Examiner* — Xuan Lu
(74) *Attorney, Agent, or Firm* — Birch, Stewart, Kolasch & Birch, LLP

(57) ABSTRACT

A method for transmitting feedback information by a remote user equipment (remote UE) in a further enhancement D2D (FeD2D) environment comprises a step of transmitting feedback information on a plurality of relay user equipments (relay UEs) which have been linked to the remote UE through a PC5 interface, wherein the feedback information is transmitted via a separate feedback channel set by a network rather than the PC5 interface, and the feedback information may be transmitted to the plurality of relay UEs in a multicast form.

16 Claims, 5 Drawing Sheets

(51) Int. Cl.
*H04W 88/04* (2009.01)
*H04W 92/18* (2009.01)
*H04W 48/10* (2009.01)
*H04L 1/00* (2006.01)

(56) References Cited

U.S. PATENT DOCUMENTS

| | | | | |
|---|---|---|---|---|
| 2016/0095133 | A1* | 3/2016 | Hwang | H04W 8/005 |
| | | | | 370/329 |
| 2016/0262111 | A1* | 9/2016 | Boudreau | H04W 76/10 |
| 2016/0278115 | A1* | 9/2016 | Shrader | H04W 72/1284 |
| 2016/0309306 | A1* | 10/2016 | Morita | H04L 67/104 |
| 2016/0381720 | A1* | 12/2016 | Baek | H04L 65/4061 |
| | | | | 370/329 |
| 2017/0013653 | A1* | 1/2017 | Suzuki | H04W 48/12 |
| 2017/0018187 | A1* | 1/2017 | Kim | H04L 67/12 |
| 2017/0093541 | A1* | 3/2017 | Pan | H04W 76/14 |
| 2017/0202042 | A1* | 7/2017 | Gao | H04W 76/14 |
| 2017/0208638 | A1* | 7/2017 | Baghel | H04W 40/22 |
| 2017/0290001 | A1* | 10/2017 | Axmon | H04W 4/70 |
| 2017/0347338 | A1* | 11/2017 | Chen | H04W 72/005 |
| 2017/0367027 | A1* | 12/2017 | Wu | H04W 40/10 |
| 2018/0084369 | A1* | 3/2018 | Hou | H04W 8/005 |
| 2018/0092017 | A1* | 3/2018 | Freda | H04W 36/36 |
| 2018/0115362 | A1* | 4/2018 | Yasukawa | H04W 40/22 |
| 2018/0115911 | A1* | 4/2018 | Huang | H04W 24/10 |
| 2018/0139694 | A1* | 5/2018 | Folke | H04W 40/22 |
| 2018/0352525 | A1* | 12/2018 | Li | H04W 56/00 |
| 2019/0199483 | A1* | 6/2019 | Zhang | H04W 72/0446 |
| 2019/0289520 | A1* | 9/2019 | Xu | H04W 36/08 |

OTHER PUBLICATIONS

Cao et al "Soft forwarding device cooperation strategies for 5G radio access networks", 2014 IEEE 25th Annual International Symposium on Personal, Indoor, and Mobile Radio Communication (PIMRC) (Year: 2014).*

Fujitsu, "Consideration on the Enhancement of UE-to-Network Relay," 3GPP TSG-RAN WG2 Meeting #93bis, R2-162240, Dubrovnik, Croatia, Apr. 11-15, 2016, pp. 1-3.

Huawei et al., "General technical consideration on PC5 enhancement for UE-To-NW relay" 3GPP TSG-RAN WG2 Meeting #93bis, R2-162641, Dubrovnik, Croatia, Apr. 11-15, 2016, 4 pages.

Qualcomm Incorporated, "Scenarios for FeD2D," 3GPP TSG-RAN WG2 Meeting #93bis, R2-162741, Dubrovnik, Croatia, Apr. 11-15, 2016, 5 pages.

Sony, "Scope and phasing of D2D Relay Enhancements," 3GPP TSG RAN WG2 NB-Meeting #93bis, R2-162636, Dubrovnik, Croatia, Apr. 11-15, 2016, 7 pages.

* cited by examiner

METHOD FOR TRANSMITTING FEEDBACK INFORMATION IN FED2D ENVIRONMENT AND APPARATUS THEREFOR

CROSS REFERENCE TO RELATED APPLICATIONS

This application is the National Phase of PCT International Application No. PCT/KR2017/004002, filed on Apr. 13, 2017, which claims priority under 35 U.S.C. 119(e) to U.S. Provisional Application No. 62/322,754, filed on Apr. 14, 2016, all of which are hereby expressly incorporated by reference into the present application.

TECHNICAL FIELD

The present invention relates to wireless communication, and more particularly, to a method of transmitting feedback information in an FeD2D environment and apparatus therefor.

BACKGROUND ART

D2D communication means that a UE communicates with another UE using a direct radio channel. Although a UE means a user's equipment, it may be regarded as a sort of a UE to which the present invention is applicable when a network equipment such as an eNB transmits/receives a signal according to a communication system with a UE. Moreover, WAN DL communications may mean various existing communications for an eNB to transmit (E)PDCCH, PDSCH, CRS, CSI-RS and the like to a UE. Or, WAN communications may mean various existing communications for a UE to transmit PRACH, PUSCH, PUCCH and the like to an eNB.

DISCLOSURE OF THE INVENTION

Technical Tasks

One technical task achieved by the present invention is to provide a method for a remote User Equipment (remote UE) to transmit feedback information in a Further Enhancement D2D (FeD2D) environment.

Another technical task achieved by the present invention is to provide a method for a relay User Equipment (relay UE) to transmit feedback information in a Further Enhancement D2D (FeD2D) environment.

Further technical task achieved by the present invention is to provide a remote User Equipment (remote UE) transmitting feedback information in a Further Enhancement D2D (FeD2D) environment.

Another further technical task achieved by the present invention is to provide a relay User Equipment (relay UE) transmitting feedback information in a Further Enhancement D2D (FeD2D) environment.

It will be appreciated by persons skilled in the art that the technical tasks that could be achieved with the present invention are not limited to what has been particularly described hereinabove and other technical tasks that the present invention could achieve will be more clearly understood from the following detailed description.

Technical Solutions

In one technical aspect of the present invention, provided herein is a method of transmitting feedback information by a remote User Equipment (remote UE) in a Further Enhancement D2D (FeD2D) environment, the method including transmitting feedback information on a plurality of relay User Equipments (relay UEs) linked to the remote UE via a PC5 interface, wherein the feedback information is transmitted through a separate feedback channel configured not by the PC5 interface but by a network and wherein the feedback information is transmitted to a plurality of the relay UEs by multicast.

The feedback information may be transmitted by event triggering and a case of the event triggering may include one of a case that a prescribed number of consecutive TB transmissions failed, a case that a measured Block Error Rate (BLER) is lower than a prescribed threshold received from the network, and a case that the remote UE needs specific System Information.

If a specific relay UE among a plurality of the relay UEs has a predefined priority or reliability level higher than that of the rest of the relay UEs, the method may further include transmitting the feedback information on the specific relay UE by unicast.

The feedback information may include a keep-alive message. The feedback information may include information indicating that a serving base station of the remote UE is out of coverage of the network.

In another technical aspect of the present invention, provided herein is a method of transmitting feedback information by a relay User Equipment (relay UE) in a Further Enhancement D2D (FeD2D) environment, the method including transmitting feedback information on a plurality of remote User Equipments (remote UEs) linked to the relay UE via a PC5 interface, wherein the feedback information is transmitted through a separate feedback channel configured not by the PC5 interface but by a network and wherein the feedback information is transmitted to a plurality of the remote UEs by multicast.

The feedback information may be transmitted by event triggering and a case of the event triggering may include one of a case that a prescribed number of consecutive TB transmissions failed and a case that a measured Block Error Rate (BLER) is lower than a prescribed threshold received from the network.

The feedback information may include information for requesting a specific remote UE to perform a relay reselection procedure if the specific remote UE among a plurality of the remote UEs has an SD-RSRP better than a threshold. The feedback information may include system information of a specific one of a plurality of the remote UEs.

In further technical aspect of the present invention, provided herein is a remote User Equipment (remote UE) transmitting feedback information in a Further Enhancement D2D (FeD2D) environment, the remote UE including a transmitter and a processor controlling the transmitter to transmit feedback information on a plurality of relay User Equipments (relay UEs) linked to the remote UE via a PC5 interface, transmit the feedback information through a separate feedback channel configured not by the PC5 interface but by a network, and transmit the feedback information to a plurality of the relay UEs by multicast.

The feedback information may be transmitted by event triggering and a case of the event triggering may include one of a case that a prescribed number of consecutive TB transmissions failed, a case that a measured Block Error Rate (BLER) is lower than a prescribed threshold received from the network, and a case that the remote UE needs specific System Information.

If a specific relay UE among a plurality of the relay UEs has a predefined priority or reliability level higher than that of the rest of the relay UEs, the processor may control the transmitter to transmit the feedback information on the specific relay UE by unicast.

In further technical aspect of the present invention, provided herein is a relay User Equipment (relay UE) transmitting feedback information in a Further Enhancement D2D (FeD2D) environment, the relay UE including a transmitter and a processor controlling the transmitter to transmit feedback information on a plurality of remote User Equipments (remote UEs) linked to the relay UE via a PC5 interface, transmit the feedback information through a separate feedback channel configured not by the PC5 interface but by a network, and transmit the feedback information to a plurality of the remote UEs by multicast.

The feedback information may be transmitted by event triggering and a case of the event triggering may include one of a case that a prescribed number of consecutive TB transmissions failed and a case that a measured Block Error Rate (BLER) is lower than a prescribed threshold received from the network.

The feedback information may include information for requesting a specific remote UE to perform a relay reselection procedure if the specific remote UE among a plurality of the remote UEs has an SD-RSRP better than a threshold.

Advantageous Effects

By a feedback information transmitting method in an FeD2D scenario according to one embodiment of the present invention, feedback information can be efficiently exchanged between a remote UE and a relay UE.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
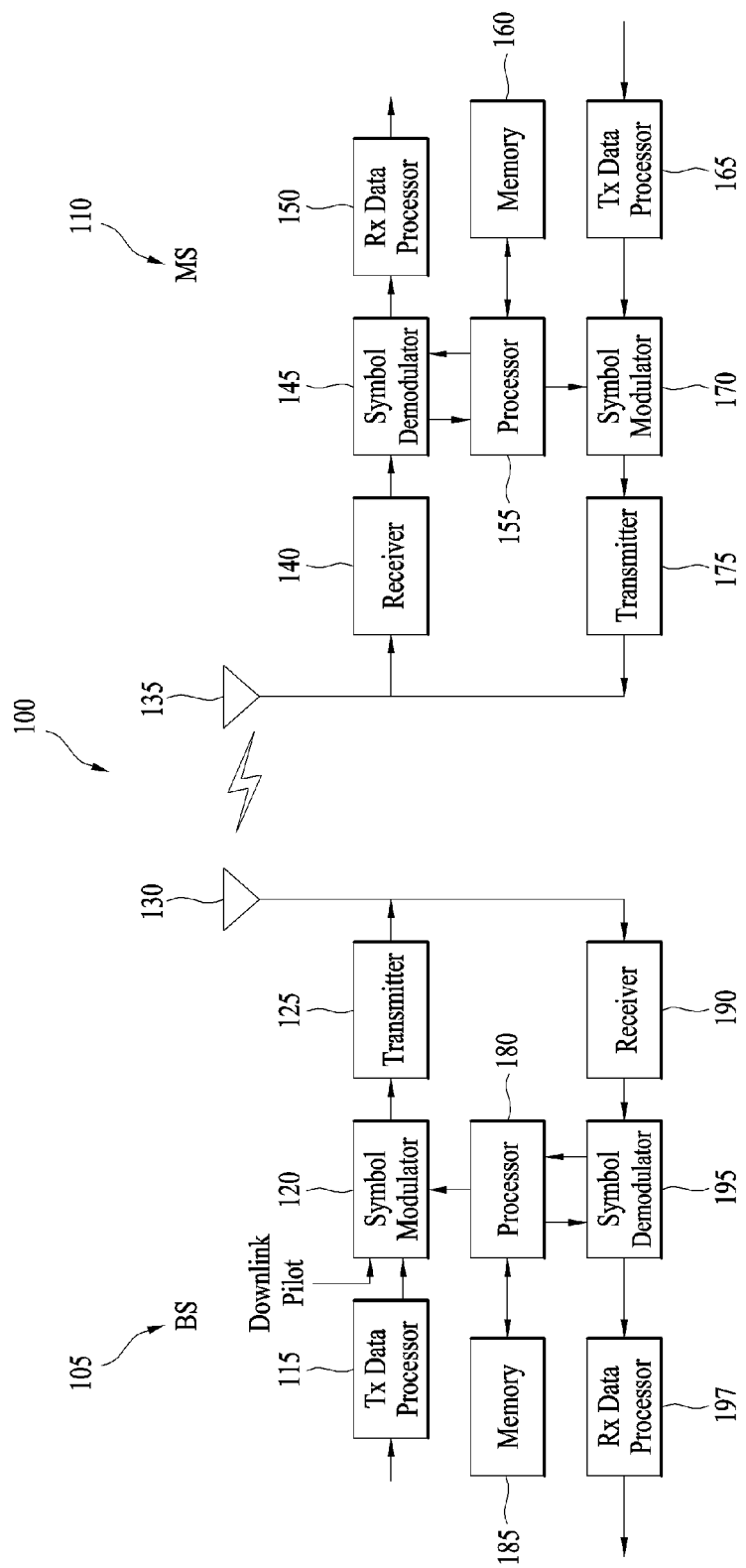
FIG. 1 is a block diagram showing configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP), gNode B and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Classification can be performed according to a content of a D2D signal transmitted on a resource pool in D2D communication. For example, a content of a D2D signal can be classified as follows. And, a separate pool may be configured for each content.

Scheduling Assignment (SA) (or, Sidelink Control (SC)): This means a signal including a location of a resource used by each D2D TX UE for transmission of a following D2D data channel and information such as MCS (modulation and coding scheme) required for demodulation of data channel, MIMO transmission scheme and the like. Such a signal can be transmitted on the same resource unit by being multiple with D2D data. In this case, an SC resource pool may mean a pool of resources on which SC is transmitted by being multiplexed with D2D data.

D2D data channel: This means a pool of resources used by a D2D TX UE to transmit user data using a resource designated through SC. If it is possible to transmit user data on the same resource unit by being multiplexed with SC information, a D2D data channel in a form except SC information may be transmitted on a resource pool for the D2D data channel. So to speak, Resource Element (RE) used in transmitting SC information on an individual resource unit in an SC resource pool is still used to transmit D2D data in a resource pool of a D2D data channel.

Discovery message: This means a resource pool for a message that enables an adjacent UE to discover a D2D TX UE having transmitted information such as an ID of its own and the like.

The standard RAN work for activating proximity services has started by focusing on public safety applications in LTE Rel. 12. Major functions standardized in LTE Rel. 12 are described as follows.

Device-to-Device discovery in network coverage (all cases of commercial and public safety uses).

In Device-to-Device broadcast communication, higher layers support groupcast and unicast communications for in-coverage/part of a network, which mainly targets public safety use cases, and out-of-coverage of the network.

There is a lot of interest in connecting and managing low-cost MTC devices using LTE technology. One of major examples of the low-cost devices is a wearable device, which is advantageous in approaching a smartphone capable of playing a role as a relay all the time.

A UE-to-network relay structure in ProSe does not discriminate traffic of a relay UE and traffic of a remote UE from each other in an access layer. This model restricts the ability that a network and operator handles a remote UE as a separate device for an individual service for billing or security. Particularly, 3GPP security association does not reach end-to-end between a network and a remote UE, which means that a relay UE has a clear text access to remote UE's communication. In order to support a relay link, service continuity, E2E QoS for possible case, efficient operation with multiple remote UEs, and end-to-end security through efficient route switching between Uu and D2D radio interfaces, UE-to-Network relaying should be enhanced.

A relaying that uses D2D may be based on a non-3GPP technology such as Bluetooth, Wi-Fi, or the like. Some enhanced functions such as service continuity may make the relaying for such technologies more attractive in commercial use cases. This can be particularly useful for the wearables due to usage patterns that are close to a user's smartphone and form-factor limitations that make direct Uu connections impractical (e.g., battery size limitations). Relaying can enable significant power savings for a remote UE (acquiring relayed traffic). This is particularly true in the deep coverage scenario. One of the cost-effective ways to introduce a relay is to use uni-directional D2D links between remote and relay devices. In this case, a relay UE can be used to relay uplink data only from a remote UE. An advantage of this approach is that there is no additional RF function to add D2D reception to the remote UE.

Figure 2:
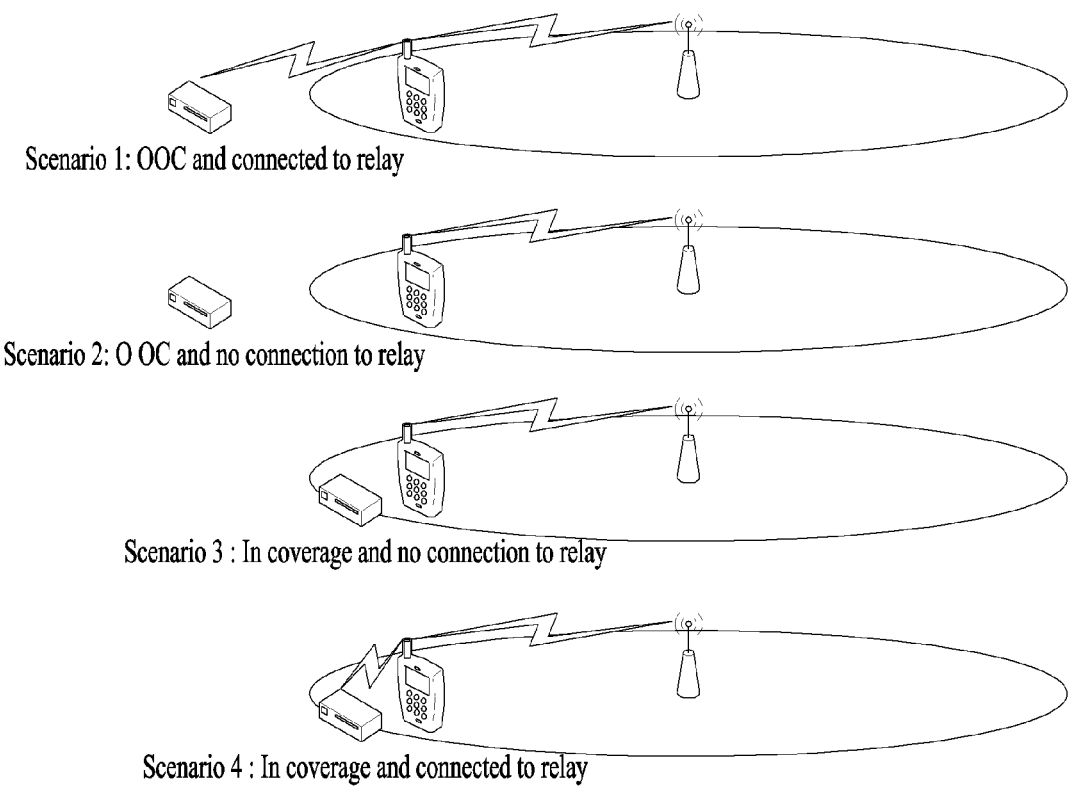
FIG. 2 is a diagram showing relay scenarios.

FIG. 2 is a diagram showing relay scenarios.

A relay scenario considers the following.

A remote UE and a relay UE are EUTRAN within the coverage.

A relay UE may be in EUTRAN coverage and a remote UE may be in enhanced coverage (the enhanced coverage means that a UE in CE mode is connected to a network through Rel-13 MTC).

A relay UE is in the EUTRAN coverage and a remote UE is out of the EUTRAN coverage.

Referring to FIG. 2, according to Scenario 1, a remote UE is located out of the EUTRAN coverage and connected to a relay UE. According to Scenario 2, a remote UE is located out of the EUTRAN coverage and not connected to a relay UE. According to scenario 3, a remote UE is located within the EUTRAN coverage and not connected to a relay UE. According to Scenario 4, a remote UE is located in the EUTRAN coverage and connected to a relay UE. As shown in FIG. 2, various relay scenarios can exist.

In Further Enhancement D2D (FeD2D) environment, a lot of transmitting D2D UEs (hereinafter 'tx D-UEs') and receiving D2D UEs (hereinafter 'tx D-UEs') coexist. In a scenario of communication between IoT/wearable based devices, a method of configuring a dedicated feedback channel for link adaptation of all receiving devices like the existing cellular communication has large signaling overhead and is very inefficient in case of considering complexity. Moreover, in FeD2D scenario, since there is no mobility and a low data rate is considered, retransmission in consideration of every Transport Block (TB) like the existing scenario may be inefficient. By considering the existing problems, the present invention proposes a method of transmitting a feedback channel by an Rx device periodically or by event triggering. Such a feedback channel is enabled through the existing D2D channel (SC, Data). In this case, feedback information is possible by the existing transmission scheme (SC, Data) or may be transmitted by being piggybacked on the existing transmission information.

Multicast Feedback Operation

It is able to consider a case that a relay UE and a remote UE are connected to a network through L2 relay operation in an FeD2D environment. In this case, data of the remote UE are forwarded to the network via the relay UE, whereby the remote UE can exchange data with the network. When a relay UE transmits or relays data to a remote UE, after the remote UE has received the data from the relay UE, a feedback method according to the present invention shall be described. Namely, the remote UE needs feedback as to the relay UE. The remote UE does not configure such feedback per relay UE individually. Instead, in aspect of a single remote UE, a method of transmitting feedback information on several relay UEs through a single feedback channel by multicast is proposed.

On the contrary, a method for a relay UE to transmit feedback information on several remote UEs through a single feedback channel by multicast is proposed as well. Although a method of transmitting feedback information by multicast is proposed, feedback information may be transmitted for a specific relay or remote UE only by unicast.

Multicast Feedback Operation by a Remote UE

As a relay UE and a remote UE are connected to each other through a PC5 interface, they are in a linked state. Consider a case that the remote UE is connected to a network through an L2 relay. Here, the PC5 interface is a radio interface newly defined for D2D data transmission/reception. And, data can be transceived between the relay UE and the remote UE through the PC5 interface.

Data are transceived between the relay UE and the remote UE through the PC5 interface. The remote UE can multicast feedback information on the relay UE to all relay UEs not through the PC5 interface but through a separate feedback channel configured by the network. Such a feedback channel is enabled through the existing D2D channel (SC, Data) as well. In this case, feedback information is possible by the existing transmission scheme (SC, Data) or may be transmitted by being piggybacked on the existing transmission information.

The network can configure a feedback channel of a multicast type of remote UEs. The remote UEs can obtain information on a feedback channel that will be multicast by the configuration of the network (e.g., a base station). The information transmitted by multicast from the network is forwarded to several relay UEs, and the remote UE can receive the information transmitted by the network via the several relay UEs.

In case of a remote UE, information for a multitude of relay UEs can be fed back through a single feedback channel. Here, the feedback information may be transmitted periodically or by event triggering if necessary. For example, a case that such an event occurs is described as follows.

Regarding examples of event occurrence, an event may be triggered: 1) in case that a prescribed number of consecutive TB transmissions failed; 2) in case that a measured Block Error Rate (BLER) is lower than a prescribed threshold (e.g., X %) received from the network; or 3) in case that a remote UE needs specific System Information (SI). If a prescribed one of the examples of the event occurrence is satisfied, a corresponding event can be triggered.

Having received feedback information, each of the relay UEs can distinguish feedback information on a prescribed relay UE or group based on Prose Layer-2 Group ID within a MAC header (e.g., sub-header) of the feedback information. Moreover, in aspect of the relay UE, it is able to distinguish that which remote UE transmitted the feedback information through Source Layer-2 ID within the feedback information.

If a priority or reliability of a specific relay UE is very higher than that of another relay UE (e.g., higher than a priority or reliability level defined in advance), a remote UE can transmit feedback information not by multicast but by unicast for the specific relay UE.

Figure 3:
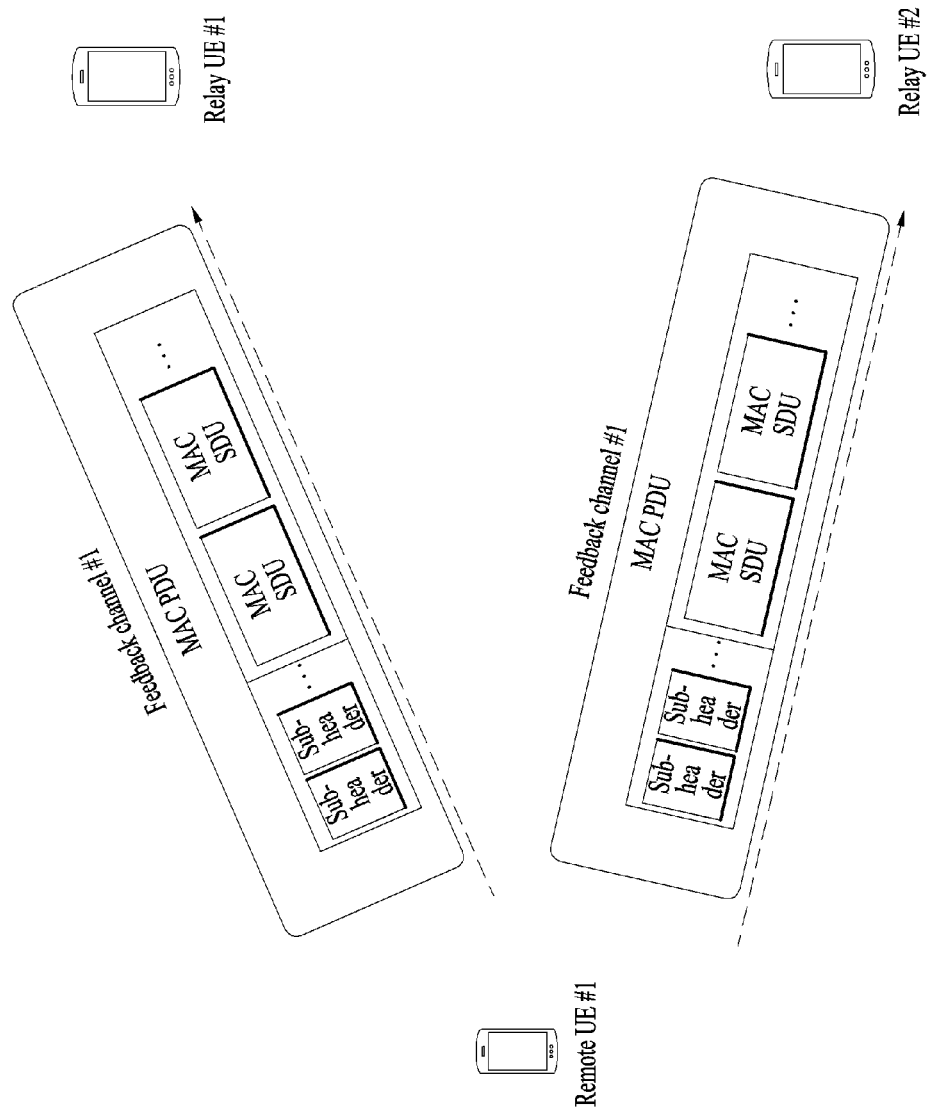
FIG. 3 is a diagram showing an example of multicast transmission of feedback information by a remote UE.

FIG. 3 is a diagram showing an example of multicast transmission of feedback information by a remote UE.

Referring to FIG. 3, a remote UE #1 can multicast feedback information on several relay UEs (e.g., a relay UE #1 and a relay UE #2) through a single feedback channel. Namely, the remote UE #1 can transmit feedback information on the relay UE #1 and the relay UE #2 through a single feedback channel (feedback channel #1) on the same physical resource (e.g., time-frequency) by multicast.

Information fed back for the relay UE #1 and the relay UE #2 by the remote UE #1 may include information (information in physical layer aspects and information in upper layer 2 aspects) as follows.

Physical Layer Aspects

Feedback information may include a measured block error rate (BLER), a collision rate, a Signal to Interference & Noise Ratio (SINR), a received power, the number of transmissions, and an ACK/NACK signal.

Upper Layer 2 Aspects

Feedback information may include a periodic keep-alive message of a remote UE. The remote UE can multicast feedback information to all relay UEs (e.g., relay UE #1 and relay UE #2) through a feedback channel instead of transmitting the feedback information by PC5 connection. And, it is possible to check whether other relay UEs are PC5-connected to a specific remote UE through the periodic keep-alive message.

The feedback information may include a notification of Out-of-Coverage (OoC) of a serving cell of the remote UE. Based on the received feedback information, the relay UE can inform the serving cell that Uu connection (remote UE and base station (eNB)) is not connected to a specific remote UE. Thereafter, the base station is aware that the Uu connection is disconnected from the specific remote UE and may not transmit data in downlink.

The feedback information may include information indicating a request for System Information (SI) necessary for the remote UE. If there is SI information necessary for the remote UE, the remote UE can make a request by transmitting feedback information.

The feedback information may include a value of Sidelink Discovery Reference Signal Received Power (SD-RSRP) of relay UEs. The fed-back SD-RSRP value may be used for a relay UE reselection procedure of a relay UE triggering type.

Multicast Feedback Operation by a Relay UE

As a relay UE and a remote UE are connected to each other through a PC5 interface, they are in a linked state. Consider a case that the remote UE is connected to a network through an L2 relay.

Data are transceived between the relay UE and the remote UE through the PC5 interface. The relay UE can multicast feedback information on the remote UE to all remote UEs not through the PC5 interface but through a separate feedback channel configured by the network. Such a feedback channel is enabled through the existing D2D channel (SC, Data) as well. In this case, feedback information is possible by the existing transmission scheme (SC, Data) or may be transmitted by being piggybacked on the existing transmission information.

The network can configure a feedback channel of a multicast type of relay UEs. The relay UEs can obtain information on a feedback channel that will be multicast by the configuration of the network (e.g., a base station). The relay UE can receive the information transmitted by the several relay UEs.

In case of a relay UE, feedback information can be received from a remote UE through a single feedback channel. Here, the feedback information may be transmitted periodically or by event triggering if necessary. For example, a case that such an event occurs is described as follows.

Regarding examples of event occurrence, an event may be triggered: 1) in case that a prescribed number of consecutive 113 transmissions failed; or 2) in case that a measured Block Error Rate (BLER) is lower than a prescribed threshold (e.g., X %) received from the network. If a prescribed one of the examples of the event occurrence is satisfied, a corresponding event can be triggered.

Having received feedback information, each of the remote UEs can distinguish feedback information on a prescribed remote UE or group based on Prose Layer-2 Group ID within a MAC header (e.g., sub-header) of the feedback information. Moreover, in aspect of the remote UE, it is able to distinguish that which relay UE transmitted the feedback information through Source Layer-2 ID within the feedback information.

If a priority or reliability of a specific remote UE is very higher than that of another remote UE, a relay UE can transmit feedback information not by multicast but by unicast for the specific remote UE.

Figure 4:
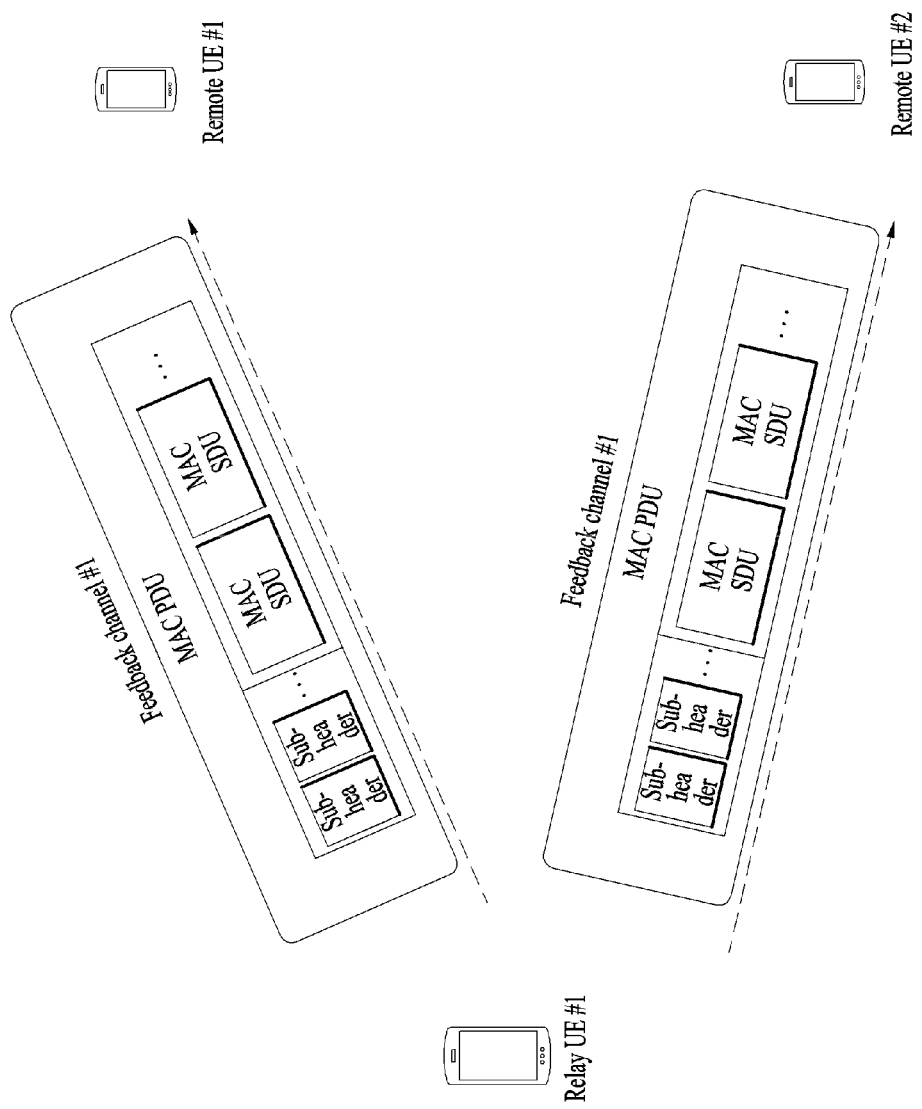
FIG. 4 is a diagram showing an example of multicast transmission of feedback information by a relay UE.

FIG. 4 is a diagram showing an example of multicast transmission of feedback information by a relay UE.

Referring to FIG. 4, a relay UE #1 can multicast feedback information on several remote UEs (e.g., a remote UE #1 and a remote UE #2) through a single feedback channel. Namely, the relay UE #1 can transmit feedback information on the remote UE #1 and the remote UE #2 through a single feedback channel (feedback channel #1) on the same physical resource (e.g., time-frequency) by multicast.

Information fed back for the remote UE #1 and the remote UE #2 by the relay UE #1 may include information as follows.

Physical Layer Aspects

Feedback information may include a measured block error rate (BLER), a collision rate, a Signal to Interference & Noise Ratio (SINR), a received power, the number of transmissions, and an ACK/NACK signal.

Upper Layer 2 Aspects

Feedback information may include information for making a request for performing a relay reselection procedure. If SD-RSRP of a specific remote UE is better than a threshold, a relay UE may make a request for performing a relay reselection procedure to the specific remote UE having the SD-RSRP better than the threshold.

Feedback information may include information indicating that System Information (SI) is transmitted to a remote UE. If a relay UE has system information necessary for a specific remote UE, it can transmit feedback information including the system information to the specific remote UE.

Figure 5:
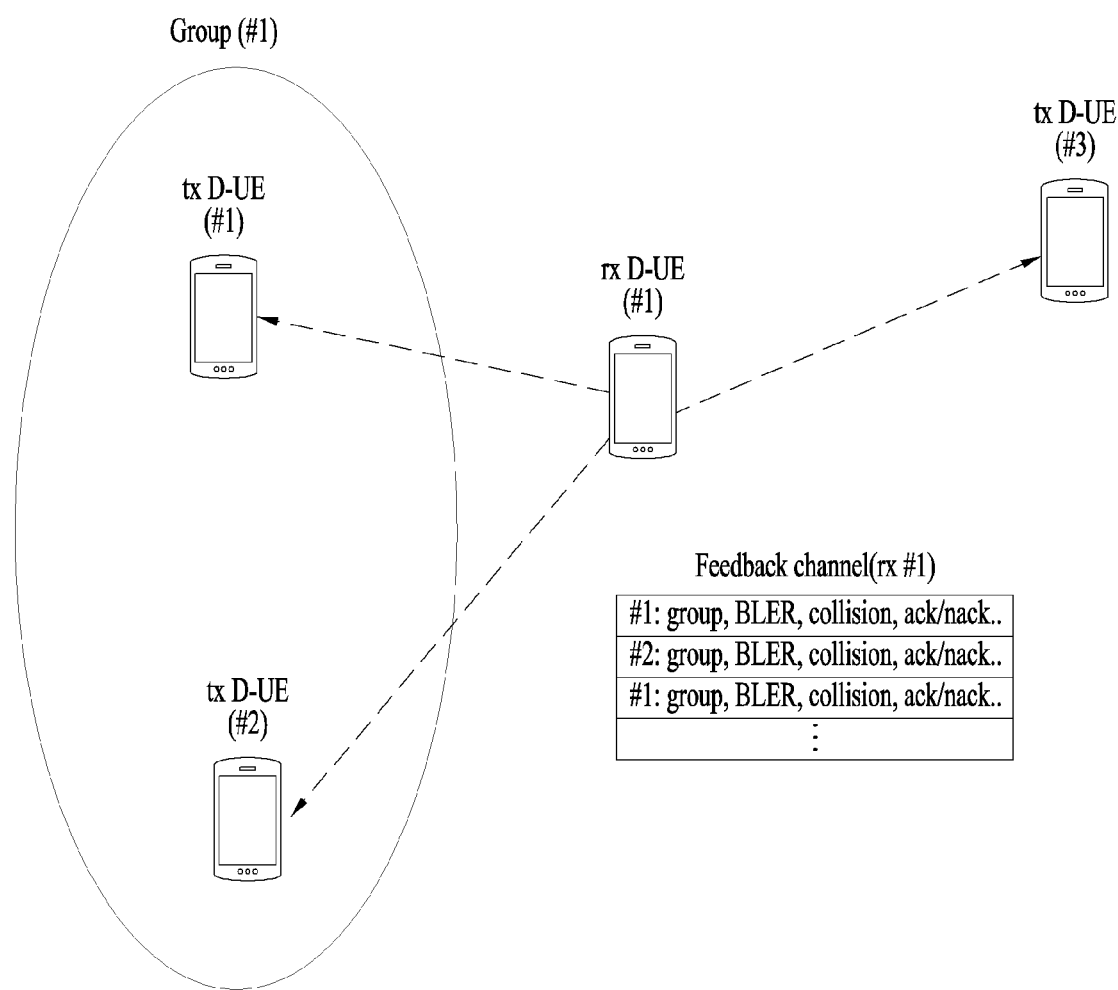
FIG. 5 is a diagram showing an example of a feedback operation through a receiving (rx) D-UE.

FIG. 5 is a diagram showing an example of a feedback operation through a receiving (rx) D-UE.

First of all, in the following description with reference to FIG. 5, an rx D-UE #1 is assumed as corresponding to a remote UE #1. A tx D-UE #1, a tx D-UE #2, and a tx D-UE #3 are assumed as corresponding to a relay UE #1, a relay UE #2, and a relay UE #3, respectively.

The rx D-UE #1 sorts groups by SA resource region and is able to broadcast feedback based on such a group. Each of the tx D-UEs of the corresponding group receives and decodes feedback information, thereby determining whether data of its own data succeeded or failed in transmission through several SA ID (source ID) informations. Moreover, if there are lots of tx D-UEs having failed in data transmission, the rx D-UE #1 can make a retransmission of a groupcast type by requesting a retransmission in group unit instead of making a request for retransmission to an individual tx D-UE. If a data transmission priority of a specific rx D-UE (e.g., rx D-UE #1) is equal to or higher than a prescribed threshold or reliability equal to or higher than the prescribed threshold needs to be secured, a tx D-UE can perform data transmission by unicast for the specific rx D-UE (e.g., rx D-UE #1).

The rx D-UE #1 (e.g., a remote UE #1) can broadcast information such as a measured block error rate (BLER), a collision rate, an SINR, a received power, the number of transmissions, and the like, which are feedback information on the neighboring tx D-UE #1, tx D-UE #2, and tx D-UE #3 (e.g., relay UE #1, relay UE #2, and relay UE #3). Such feedback of the rx D-UE #1 may operate periodically and can be transmitted for specific tx D-UEs (e.g., tx D-UE #1) by event triggering.

Such events can be defined in various scenarios. Regarding examples of event occurrence, an event may be triggered: 1) in case that a prescribed number of consecutive TB transmissions failed; 2) in case that a measured Block Error Rate (BLER) is lower than a prescribed threshold (e.g., X %) received from the network; or 3) in case that collision of transmission of report data of SAs of an SA pool occurs (partially), a corresponding event can be triggered. If a prescribed one of the examples of the event occurrence is satisfied, a corresponding event can be triggered.

Based on such feedback information, as a feedback operation, the tx D-UEs can reselect resources, adjust MCS, or perform power control operations.

Secondly, in the following description with reference to FIG. 5, an rx D-UE #1 is assumed as corresponding to a relay UE #1. A tx D-UE #1, a tx D-UE #2, and a tx D-UE #3 are assumed as corresponding to a remote UE #1, a remote UE #2, and a remote UE #3, respectively.

The rx D-UE #1 sorts groups by SA resource region and is able to broadcast feedback based on such a group. Each of the tx D-UEs of the corresponding group receives and decodes feedback information, thereby determining whether data of its own data succeeded or failed in transmission through several SA ID (source ID) informations. Moreover, if there are lots of tx D-UEs having failed in data transmission, the rx D-UE #1 can make a retransmission of a groupcast type by requesting a retransmission in group unit instead of making a request for retransmission to an individual tx D-UE. If a data transmission priority of a specific rx D-UE (e.g., rx D-UE #1) is equal to or higher than a prescribed threshold or reliability equal to or higher than the prescribed threshold needs to be secured, a tx D-UE can perform data transmission by unicast for the specific rx D-UE (e.g., rx D-UE #1).

The rx D-UE #1 (e.g., a relay UE #1) can broadcast information such as a measured block error rate (BLER), a collision rate, an SINR, a received power, the number of transmissions, and the like, which are measured as feedback information on the neighboring tx D-UE #1, tx D-UE #2, and tx D-UE #3 (e.g., remote UE #1, remote UE #2, and remote UE #3). Such feedback of the rx D-UE #1 may operate periodically and can be transmitted for specific tx D-UEs (e.g., tx D-UE #1) by event triggering.

Such events can be defined in various scenarios. Regarding examples of event occurrence, an event may be triggered: 1) in case that a prescribed number of consecutive TB transmissions failed; 2) in case that a measured Block Error Rate (BLER) is lower than a prescribed threshold (e.g., X %) received from the network; or 3) in case that collision of transmission of report data of SAs of an SA pool occurs (partially), a corresponding event can be triggered. If a prescribed one of the examples of the event occurrence is satisfied, a corresponding event can be triggered.

Based on such feedback information, as a feedback operation, the tx D-UEs can reselect resources, adjust MCS, or perform power control operations.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

A method of transmitting feedback information in an FeD2D environment is industrially applicable to various kinds of wireless communication systems such as 3GPP LTE-A system, 5G system, IoT technology, etc.

What is claimed is:

1. A method performed by a remote user equipment (UE) in a wireless communication system, the method comprising:
   receiving, from a network, information related to a configuration for a feedback channel;
   receiving, from the network, via a first relay UE, first data based on a PC5 interface;
   receiving, from the network, via a second relay UE, second data based on the PC5 interface;
   receiving, from the network, via a third relay UE, third data based on the PC5 interface;
   transmitting, to the first relay UE and the second relay UE, first feedback information related to the first data and the second data through the feedback channel; and
   transmitting, to the third relay UE, second feedback information including third information related to the third data,
   wherein the first relay UE and the second relay UE are linked to the remote UE based on the PC5 interface, and
   wherein the first feedback information is broadcasted to the first relay UE and the second relay UE and the second feedback information is unicasted to the third relay UE, based on the third relay UE having a higher priority than the first relay UE and the second relay UE.

2. The method of claim 1, wherein the first feedback information is broadcasted based on detecting an event, and wherein the event comprises at least one of a first event that a prescribed number of consecutive transport block (TB) transmissions failed, a second event that a measured block error rate (BLER) is lower than a prescribed threshold received from the network, or a third event that the remote UE needs system information.

3. The method of claim 1, wherein the first feedback information includes a keep-alive message.

4. The method of claim 1, wherein the first feedback information includes information indicating that the remote UE is out of coverage of the network.

5. The method of claim 1, wherein the first feedback information comprises at least one of an acknowledge (ACK)/negative-ACK (HACK), a measured block error rate (BLER), a collision rate, a signal to interference and noise ratio (SINK), a received power or a number of transmissions.

6. The method of claim 1, wherein the first feedback information includes an identifier related to a UE group including the first relay UE and the second relay UE.

7. A method performed by a relay user equipment (UE) in a wireless communication system, the method comprising:
   receiving, from a network, information related to a configuration for a feedback channel;
   receiving, from a first remote UE, first data based on a PC5 interface;
   receiving, from a second remote UE, second data based on the PC5 interface;
   receiving, from a third remote UE, third data based on the PC5 interface;
   transmitting, to the first remote UE and the second remote UE, first feedback information related to the first data and the second data through the feedback channel; and
   transmitting, to the third remote UE, second feedback information including third information related to the third data,
   wherein the first remote UE and the second remote UE are linked to the relay UE based on the PC5 interface, and
   wherein the first feedback information is broadcasted to the first remote UE and the second remote UE and the second feedback information is unicasted to the third remote UE, based on the third remote UE having a higher priority than the first remote UE and the second remote UE.

8. The method of claim 7, wherein the first feedback information is broadcasted based on detecting an event, and wherein the event comprises at least one of a first event that a prescribed number of consecutive transport block (TB) transmissions failed, a second event that a measured block error rate (BLER) is lower than a prescribed threshold received from the network, or a third event that the relay UE needs system information.

9. The method of claim 7, wherein the first feedback information includes information for requesting a specific remote UE to perform a relay reselection procedure based on the specific remote UE among a plurality of remote UEs having a sidelink discovery reference signal received power (SD-RSRP) better than a threshold.

10. The method of claim 7, wherein the first feedback information includes system information of a specific one of a plurality of remote UEs.

11. A remote user equipment (UE) in a wireless communication system, the remote UE comprising:
   a transceiver; and
   a processor coupled to the transceiver and configured to:
   receive, from a network, information related to a configuration for a feedback channel;

receive, from the network, via a first relay UE, first data based on a PC5 interface;
receive, from the network, via a second relay UE, second data based on the PC5 interface;
receive, from the network, via a third relay UE, third data based on the PC5 interface;
transmit, to the first relay UE and the second relay UE, first feedback information related to the first data and the second data through the feedback channel; and
transmitting, to the third relay UE, second feedback information including third information related to the third data,
wherein the first relay UE and the second relay UE are linked to the remote UE based on the PC5 interface, and
wherein the first feedback information is broadcasted to the first relay UE and the second relay UE and the second feedback information is unicasted to the third relay UE, based on the third relay UE having a higher priority than the first relay UE and the second relay UE.

12. The remote UE of claim 11, wherein the first feedback information is broadcasted based on detecting an event, and
wherein the event comprises at least one of a first event that a prescribed number of consecutive transport block (TB) transmissions failed, a second event that a measured block error rate (BLER) is lower than a prescribed threshold received from the network, or a third event that the remote UE needs system information.

13. The remote UE of claim 11, wherein the first feedback information includes a keep-alive message.

14. A relay user equipment (UE) in a wireless communication system, the relay UE comprising:
a transceiver; and
a processor coupled to the transceiver and configured to:
receive, from a network, information related to a configuration for a feedback channel;
receive, from a first remote UE, first data based on a PC5 interface;
receive, from a second remote UE, second data based on the PC5 interface;
receive, from a third remote UE, third data based on the PC5 interface;
transmit, to the first remote UE and the second remote UE, first feedback information related to the first data and the second data through the feedback channel; and
transmit, to the third remote UE, second feedback information including third information related to the third data,
wherein the first remote UE and the second remote UE are linked to the relay UE based on the PC5 interface, and
wherein the first feedback information is broadcasted to the first remote UE and the second remote UE and the second feedback information is unicasted to the third remote UE, based on the third remote UE having a higher priority than the first remote UE and the second remote UE.

15. The relay UE of claim 14, wherein the first feedback information is broadcasted based on detecting an event, and
wherein the event comprises at least one of a first event that a prescribed number of consecutive transport block (TB) transmissions failed, a second event that a measured block error rate (BLER) is lower than a prescribed threshold received from the network, or a third event that the relay UE needs system information.

16. The relay UE of claim 14, wherein the first feedback information includes information for requesting a specific remote UE to perform a relay reselection procedure based on the specific remote UE among a plurality of remote UEs having a sidelink discovery reference signal received power (SD-RSRP) better than a threshold.

* * * * *